(12) United States Patent
Janik et al.

(10) Patent No.: US 7,383,418 B2
(45) Date of Patent: Jun. 3, 2008

(54) METHOD AND APPARATUS FOR PREFETCHING DATA TO A LOWER LEVEL CACHE MEMORY

(75) Inventors: Kenneth J. Janik, Beaverton, OR (US); K S Venkatraman, Hillsboro, OR (US); Anwar Rohillah, Hillsboro, OR (US); Eric Sprangle, Portland, OR (US); Ronak Singhal, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 115 days.

(21) Appl. No.: 10/933,188

(22) Filed: Sep. 1, 2004

(65) Prior Publication Data

US 2006/0047915 A1   Mar. 2, 2006

(51) Int. Cl.
*G06F 12/00* (2006.01)
*G06F 9/34* (2006.01)
*G06F 9/26* (2006.01)

(52) U.S. Cl. .................. 711/216; 711/137; 711/117; 711/118; 711/119; 710/52

(58) Field of Classification Search .............. 711/122, 711/137, 216
See application file for complete search history.

(56) References Cited

U.S. PATENT DOCUMENTS

| | | | |
|---|---|---|---|
| 5,146,578 A * | 9/1992 | Zangenehpour | ............. 711/137 |
| 5,528,762 A | 6/1996 | Iyer | |
| 5,671,444 A * | 9/1997 | Akkary et al. | ................. 710/52 |
| 5,721,864 A * | 2/1998 | Chiarot et al. | .............. 711/137 |
| 5,758,119 A * | 5/1998 | Mayfield et al. | ............. 711/122 |
| 6,134,643 A * | 10/2000 | Kedem et al. | .............. 711/213 |
| 6,163,839 A | 12/2000 | Janik et al. | |
| 6,247,115 B1 | 6/2001 | Janik et al. | |
| 6,317,810 B1 * | 11/2001 | Lopez-Aguado et al. | ... 711/120 |
| 6,351,805 B2 | 2/2002 | Janik et al. | |
| 6,359,951 B1 | 3/2002 | Morriss et al. | |
| 6,473,836 B1 * | 10/2002 | Ikeda | .......................... 711/137 |
| 6,542,557 B2 | 4/2003 | Morriss et al. | |
| 6,553,485 B2 | 4/2003 | Janik et al. | |
| 6,574,712 B1 * | 6/2003 | Kahle et al. | ................. 711/137 |
| 6,691,222 B2 | 2/2004 | Janik et al. | |
| 6,721,866 B2 | 4/2004 | Roussel et al. | |
| 6,732,203 B2 | 5/2004 | Kanapathippillai et al. | |
| 6,744,810 B1 | 6/2004 | Iyer et al. | |

(Continued)

OTHER PUBLICATIONS

Microsoft Computer Dictionary, Copyright 2002, Microsoft Publishing, Fifth Edition, p. 248.*

(Continued)

*Primary Examiner*—Donald Sparks
*Assistant Examiner*—Prasith Thammavong
(74) *Attorney, Agent, or Firm*—Trop, Pruner & Hu, P.C.

(57) ABSTRACT

A prefetching scheme to detect when a load misses the lower level cache and hits the next level cache. Consequently, the prefetching scheme utilizes the previous information for the cache miss to the lower level cache and hit to the next higher level of cache memory that may result in initiating a sidedoor prefetch load for fetching the previous or next cache line into the lower level cache. In order to generate an address for the sidedoor prefetch, a history of cache access is maintained in a queue.

2 Claims, 3 Drawing Sheets

U.S. PATENT DOCUMENTS

| | | |
|---|---|---|
| 6,775,747 B2 | 8/2004 | Venkatraman |
| 2002/0083273 A1* | 6/2002 | Matsubara et al. ......... 711/137 |
| 2002/0144062 A1* | 10/2002 | Nakamura ................. 711/137 |
| 2003/0196026 A1* | 10/2003 | Moyer ....................... 711/103 |
| 2004/0003179 A1* | 1/2004 | Shirahige et al. ........... 711/137 |
| 2004/0049640 A1* | 3/2004 | So et al. .................... 711/137 |
| 2004/0073752 A1* | 4/2004 | Musumeci ................. 711/137 |
| 2004/0215921 A1* | 10/2004 | Alexander et al. .......... 711/216 |
| 2004/0243767 A1* | 12/2004 | Cierniak et al. ............ 711/137 |

OTHER PUBLICATIONS

Tendler et al, IBM Server Group, IBM eserver—Power4 System Microarchitecture—Technical White Paper—Oct. 2001.

* cited by examiner

METHOD AND APPARATUS FOR PREFETCHING DATA TO A LOWER LEVEL CACHE MEMORY

BACKGROUND

The present disclosure is related to cache memory, and more particularly, to a prefetching data to a lower level cache memory address translation.

DESCRIPTION OF RELATED ART

As is well known, a cache or cache memory stores information, such as for a computer or computing system. The speed performance of a cache tends to decrease data retrieval times for a processor. The cache stores specific subsets of data in high-speed memory. A few examples of data include instructions and addresses.

A cache location may be accessed based at least in part on a memory address. Typically, however, a cache operates at least in part by receiving a virtual memory address and translating it into a physical memory address. The translation may include a plurality of memory accesses, commonly referred to here as "levels of translation," for performing the intermediate translations. Commonly, a Translation Lookaside Buffer (TLB) may facilitate the translation by storing a plurality of page tables for processing the intermediate levels of translation. The page tables are accessed in a manner commonly referred to as "page walk."

In the event of a cache miss to a lower level cache, a search for the particular information is conducted at the next higher level of cache memory. However, this significantly increases the latency of the next level cache.

BRIEF DESCRIPTION OF THE DRAWINGS

Claimed subject matter is particularly and distinctly pointed out in the concluding portion of the specification. The claimed subject matter, however, both as to organization and method of operation, together with objects, features, and advantages thereof, may best be understood by reference to the following detailed description when read with the accompanying drawings in which:

DETAILED DESCRIPTION

In the following detailed description, numerous specific details are set forth in order to provide a thorough understanding of the claimed subject matter. However, it will be understood by those skilled in the art that the claimed subject matter may be practiced without these specific details. In other instances, well-known methods, procedures, components and circuits have not been described in detail so as not to obscure the claimed subject matter.

An area of current technological development relates to improving the efficiency of cache memories by reducing the latency associated with cache memories. As previously described, a cache miss to a lower level cache results in increased latency for the next higher level of cache memory.

In contrast, an embodiment is proposed for prefetching data to a lower level cache memory. For example, the prefetching scheme is to detect when a load misses the lower level cache and hits the next level cache. Consequently, the prefetching scheme utilizes the previous information for the cache miss to the lower level cache and hit to the next higher level of cache memory that may result in initiating a sidedoor prefetch load for fetching the previous or next cache line into the lower level cache. In one embodiment, the sidedoor prefetch load is dispatched by a Page Miss Handler (PMH). As is well known, a PMH stores and updates page tables. In order to determine the address for this sidedoor prefetch load, a history of cache access is maintained in a new structure within the PMH. In one embodiment, the history of cache accesses is for load micro ops and the new structure is designated as a prefetch match queue. In one embodiment, the prefetch match queue is a direct-mapped hashed prefetch match queue.

Figure 1:
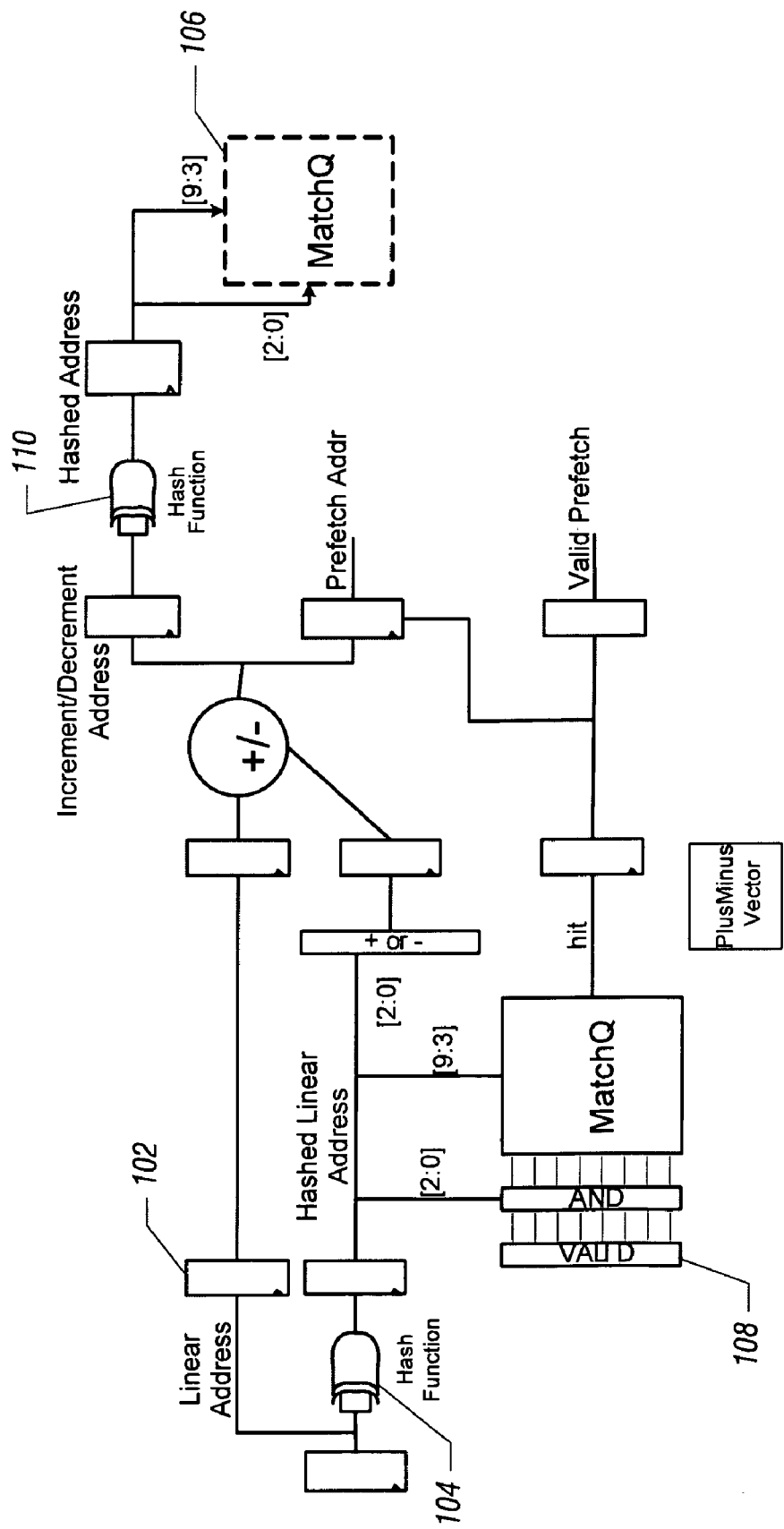
FIG. 1 is a schematic diagram illustrating a logic block for prefetching data to a lowest level cache as utilized by an embodiment in accordance with the claimed subject matter.

FIG. 1 is a schematic diagram illustrating a logic block for prefetching data to a lowest level cache as utilized by an embodiment in accordance with the claimed subject matter. The logic block depicts an analysis for a load that misses in the lower level cache and hits in the next level cache. Consequently, the logic block allows for prefetching a cache line for a hit to the prefetch match queue. The cache line that is fetched is based at least in part on a value of a PlusMinus vector that indicates a direction of the prefetch.

Initially, a hashed compression scheme, at label 104, is performed on the linear address. In one embodiment, the hash function is as follows:

DEFINE PREFETCH_HASH_42_TO_10(Hash, LA)=[
  Hash[9]:=LA[47] XOR LA[37] XOR LA[27] XOR LA[17] XOR LA[10];
  Hash[8]:=LA[46] XOR LA[36] XOR LA[26] XOR LA[16] XOR LA[09];
  Hash[7]:=LA[45] XOR LA[35] XOR LA[25] XOR LA[15];
  Hash[6]:=LA[44] XOR LA[34] XOR LA[24] XOR LA[14];
  Hash[5]:=LA[43] XOR LA[33] XOR LA[23] XOR LA[13];
  Hash[4]:=LA[42] XOR LA[32] XOR LA[22] XOR LA[12];
  Hash[3]:=LA[41] XOR LA[31] XOR LA[21] XOR LA[11];
  Hash[2]:=LA[40] XOR LA[30] XOR LA[20] XOR LA[08];
  Hash[1]:=LA[39] XOR LA[29] XOR LA[19] XOR LA[07];
  Hash[0]:=LA[38] XOR LA[28] XOR LA[18] XOR LA[06];

Likewise, in the same embodiment, the prefetch match queue is a direct mapped 8 entry by 7-bit structure and is accessed entirely based on the 10-bit hashed linear address. Bits [2:0] picks one of the 8 entries to look up. The array then compares the seven bits [9:3] of the hashed linear address with the seven bits stored at that location in the array. If they match, a hit is signaled and a prefetch is eventually generated.

Otherwise, if a hit is not signaled, the non-hashed linear address is incremented, then hashed to 10-bits, then bits [9:3] of the hashed linear address are written into the location specified by bits [2:0] of the hashed linear address. In the next cycle, the same thing happens to the decremented version of the linear address.

Therefore, this provides a randomized replacement scheme without having to do a fully-associative content addressable memory (CAM) lookup. In one embodiment, there are two vectors associated with each entry in the prefetch match queue with a one-to-one mapping to the prefetch match queue entries: In one embodiment, a valid vector 108 determines whether a particular prefetch match queue entry is valid. Consequently, this is used to prevent multiple prefetches from being initiated from the same entry.

As previously discussed, the hashed linear address is used to search the prefetch match queue. In the case of a miss to the prefetch match queue, the linear address is incremented and is also decremented by a cache line and is processed through the hashing compression 110 and is written into the prefetch match queue 106 (depicted as dashed box with matchq). The valid bit associated with the written entry is set. For the address that was incremented by a cache line, a "+" is written into the PlusMinus vector and a "−" is written for the address that was decremented by a cache line. For example, a binary value of one in the PlusMinus vector would indicate a "+" and a binary value of zero in the PlusMinus vector would indicate a "−". Obviously, the claimed subject matter is not limited to this embodiment since alternative values may be assigned.

Otherwise, in the case of a hit to the prefetch match queue, the PlusMinus vector is read to determine in which direction the stream is proceeding. Based on the value of the PlusMinus vector, the original load's linear address (label 102) is incremented or decremented. This address is then dispatched to bring the next cache line into the lower level cache. Likewise, this prefetch address goes through the hashing compression and is written along with it's parent's PlusMinus value into the prefetch match queue. The entry which was hit in the prefetch match queue to initially initiate this prefetch is cleared at this time to prevent any future demand loads from generating duplicate prefetches to the same address.

Figure 2:
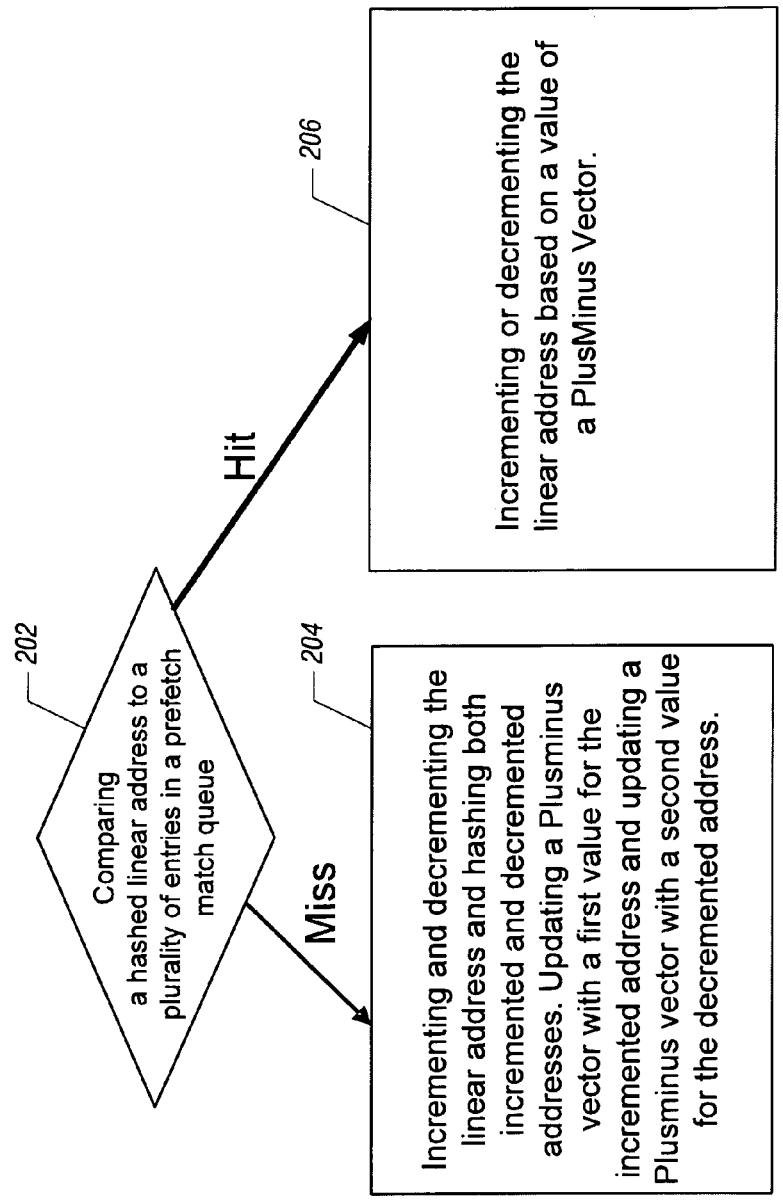
FIG. 2 is a method of a flowchart for prefetching data to a lowest level cache as utilized by an embodiment in accordance with the claimed subject matter.

FIG. 2 is a flowchart illustrating an embodiment of a method in accordance with the claimed subject matter. The embodiment includes, but is not limited to, a plurality of diamonds and blocks 202, 204, and 206. In one embodiment, the claimed subject matter depicts prefectching data for a load that misses in the lower level cache and hits in the next level cache. Initially, the method depicts comparing a hashed linear address to a plurality of entries in a prefetch match queue, as indicated by decision block 202. Based on this result, either block 204 or 206 is initiated. In the event of a miss, wherein the hashed linear address is not found in the prefetch match queue, block 204 is initiated. Within this block, the method depicts incrementing and decrementing the linear address and hashing both incremented and decremented addresses. Likewise, the method depicts updating a Plusminus vector with a first value for the incremented address and updating a Plusminus vector with a second value for the decremented address. Otherwise, in the event of a hit, wherein the hashed linear address is found in the prefetch match queue, block 206 is initiated. Within this block, the method depicts incrementing or decrementing the linear address based on a value of a PlusMinus Vector.

To illustrate with one example of the prefetching scheme, assume a stream of loads to addresses 0xFFFF0080, 0xFFFF00C0 (and they all miss the L0 (lower level cache) but hit the L1 (next higher level cache), etc, then we want to predict that the addresses are being incremented and prefetch address 0xFFFF0100 into the L0. Also, assume load to 0xFFFF0080 is the 1st load in the machine, matchQ is empty at this point. Load to address 0xFFFF0080 will get a matchQ miss. The PMH prefetch logic will then update the prefetch matchQ with addresses (their 10 bit hash,not the entire linear address) 0xFFFF0040 (-/decremented cache line) and 0xFFFF00C0 (+/incremented cache line). When load to 0xFFFF00C0 comes by, it will get a matchQ hit. Also, the + indicates the direction -linear addresses are being incremented. So, the PMH will generate a S/D prefetch load micro op to address 0xFFFF0100. The prefetch address 0xFFFF0100 will be put into the matchQ and the entry which was hit will be invalidated. Invalidating the hit entry prevents other demand loads from issuing the same prefetch. Similarly, if the test had issued a stream of loads to addresses 0xFFFF0080, 0xFFFF0040, the PMH matchQ logic would have generated a S/D prefetch load to address 0xFFFF0000.

If a matchQ hit occurs and the incremented/decremented prefetch address crosses a 4K page boundary from the originating load, the prefetch is stopped.

Figure 3:
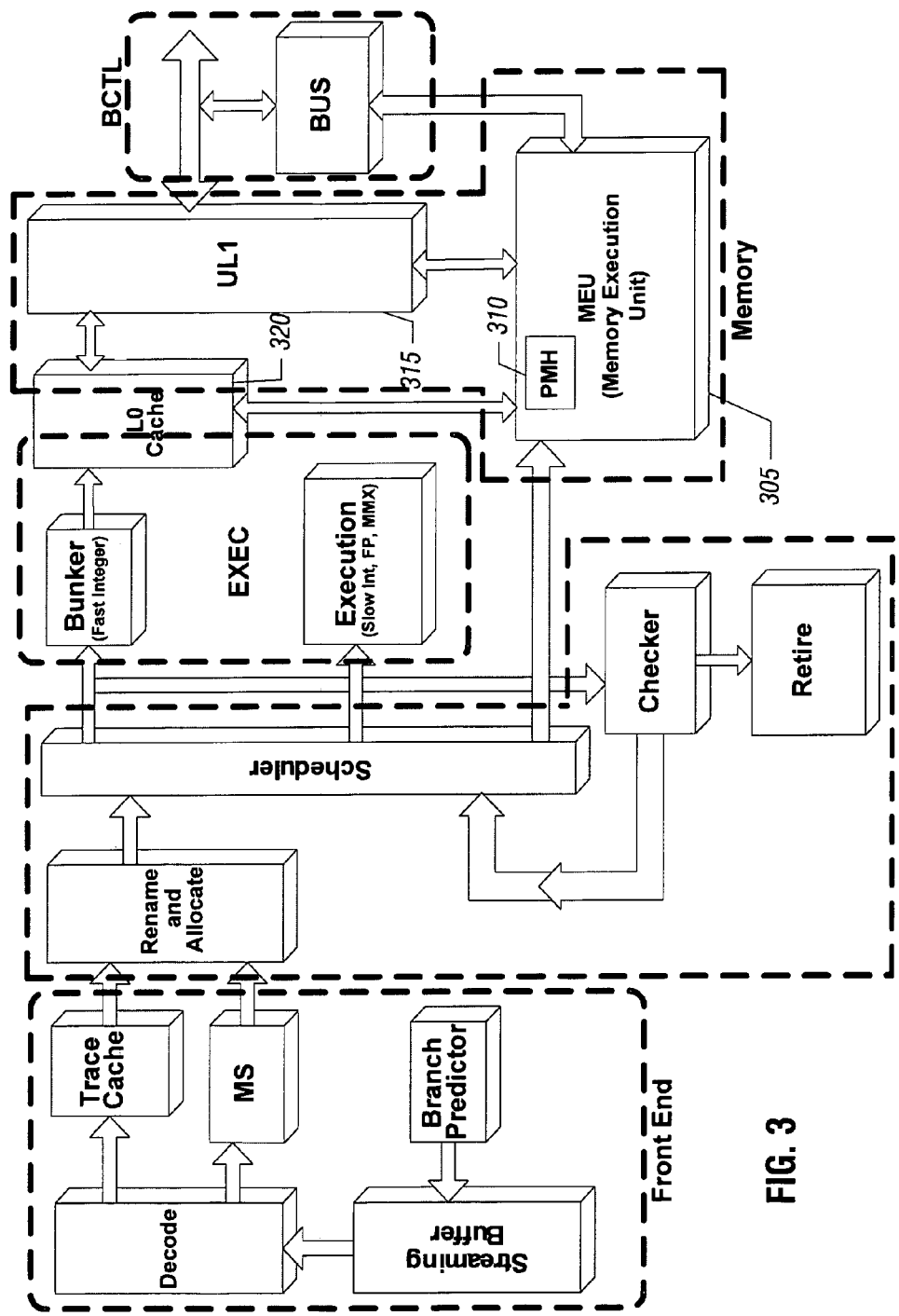
FIG. 3 is a block diagram illustrating a system that may employ the embodiments of FIG. 1 or 2 or both.

FIG. 3 is a block diagram illustrating a system that may employ the embodiments of FIGS. 1 and 2. In this embodiment, the Page Miss Handler (block 310) is located within the Memory Execution Unit (MEU) (block 305) and the bidirectional path between the MEU and L0 cache (lower level cache) (block 320) allows for communication for the sidedoor prefetch. In this embodiment, UL1 (block 315) is the next higher level of cache to the L0 cache.

While certain features of the claimed subject matter have been illustrated and detailed herein, many modifications, substitutions, changes and equivalents will now occur to those skilled in the art. It is, therefore, to be understood that the appended claims are intended to cover all such modifications and changes as fall within the true spirit of the claimed subject matter.

The invention claimed is:

1. A method for prefetching data to a lower level cache in the event of a miss to the lower level cache and a subsequent hit to a next level cache memory comprising:
   comparing a linear address that has been hashed to a plurality of entries in a prefetch match queue;
   if the comparison is a miss to the prefetch match queue, incrementing and decrementing the linear address and hashing both incremented and decremented addresses and storing entries in the prefetch match queue for the hashed incremented and decremented addresses and updating a PlusMinus vector with a first value for the incremented address and updating the PlusMinus vector with a second value for the decremented address; and
   if instead the comparison is a hit to the prefetch match queue, incrementing or decrementing the linear address based on a value of the PlusMinus Vector, wherein the lower level cache is closer to an execution unit than the next level cache memory, and wherein the hashing is as follows:
   DEFINE PREFETCH HASH 42 TO 10(Hash, LA) =[
     Hash[9]:=LA[47]XOR LA[37]XOR LA[27]XOR LA[17]XOR LA[10];
     Hash[8]:=LA[46]XOR LA[36]XOR LA[26]XOR LA[16]XOR LA[09];
     Hash[7]:=LA[45]XOR LA[35]XOR LA[25]XOR LA[15];
     Hash[6]:=LA[44]XOR LA[34]XOR LA[24]XOR LA[14];
     Hash[5]:=LA[43]XOR LA[33]XOR LA[23]XOR LA[13];
     Hash[4]:=LA[42]XOR LA[32]XOR LA[22]XOR LA[12];

Hash[3]:=LA[41]XOR LA[31]XOR LA[21]XOR LA[11];
Hash[2]:=LA[40]XOR LA[30]XOR LA[20]XOR LA[08];
Hash[1]:=LA[39]XOR LA[29]XOR LA[19]XOR LA[07];
Hash[0]:=LA[38]XOR LA[28]XOR LA[18]XOR LA[06]];

wherein LA corresponds to a linear address, Hash is a resulting bit of the hashing and numbers in the square brackets correspond to respective bits of the LA or the hash.

2. The method of claim 1, further comprising sending the incremented or decremented address to the next level cache memory to prefetch data.

* * * * *